United States Patent
Burdgick et al.

(10) Patent No.: US 7,121,796 B2
(45) Date of Patent: Oct. 17, 2006

(54) NOZZLE-COOLING INSERT ASSEMBLY WITH CAST-IN RIB SECTIONS

(75) Inventors: Steven S. Burdgick, Schenectady, NY (US); Gary M. Itzel, Schenectary, NY (US)

(73) Assignee: General Electric Company, Schenectady, NY (US)

( * ) Notice: Subject to any disclaimer, the term of this patent is extended or adjusted under 35 U.S.C. 154(b) by 92 days.

(21) Appl. No.: 10/834,925

(22) Filed: Apr. 30, 2004

(65) Prior Publication Data
US 2006/0140750 A1    Jun. 29, 2006

(51) Int. Cl.
*F01D 5/18*    (2006.01)

(52) U.S. Cl. .................. 416/96 A; 29/889.722

(58) Field of Classification Search .............. 416/96 A, 416/224; 29/889.722
See application file for complete search history.

(56) References Cited

U.S. PATENT DOCUMENTS 6,453,557 B1 *   9/2002   Burgdick ............... 29/889.722

* cited by examiner

*Primary Examiner*—Edward K. Look
*Assistant Examiner*—Richard A. Edgar
(74) *Attorney, Agent, or Firm*—Nixon & Vanderhye P.C.

(57) ABSTRACT

A cooling insert/nozzle assembly for use in gas turbines or similar machinery includes a nozzle having inner and outer ribs with cast-in "T" sections and "L" sections, respectively, at the end of the ribs in which air flow enters the nozzle. The assembly further includes a cooling insert having a flexible end which is inserted between adjacent ribs having either the cast-in "T" or "L" sections.

6 Claims, 3 Drawing Sheets

Inlet Flow

NOZZLE-COOLING INSERT ASSEMBLY WITH CAST-IN RIB SECTIONS

FIELD OF THE INVENTION

The invention is directed to an improved cooling insert and nozzle assembly used in gas turbines, aircraft engines, or similar turbine machinery. More particularly the invention is directed to casting a "T" or "L" section at the end of specific nozzle ribs facilitating the installation of cooling inserts within the nozzles by welding or brazing the cooling inserts to the nozzle ribs having the "T" or "L" sections. The invention further involves providing the cooling inserts with flexible ends thereby obviating the need for stiff end collars and significantly improving the rib to insert interface resulting in simplified cooling inserts and reduced nozzle machining.

BACKGROUND OF THE INVENTION

In turbine nozzles conventional impingement cooling inserts are disposed inside nozzle cavities to augment heat transfer coefficients and increase cooling of the airfoil walls.

As shown in FIGS. 1–2, insert 10 is disposed within nozzle 11. The dashed line in FIG. 1 denotes the location of a metering plate. Conventional cooling inserts, shown in FIG. 3, that are mounted inside the airfoil cavity, as opposed to the outside nozzle wall, typically involve the use of stiff collars 30 on the ends of the inserts 10. As a result, the nozzle ribs 31 must be machined on both sides to create proper tight tolerance interfaces for the inserts.

These ribs are typical of most nozzle designs and are primarily for structural purposes. In an open and closed circuit cooling design it is desirable to seal the cooling insert along the entire perimeter. This seal weld or braze involves a weld along two sides to the nozzle sidewall, with the other two sides being a weld to the nozzle internal ribs. Typically the ends of the ribs need to be machined to achieve a proper interface for welding or brazing.

The provision of stiff collar 30 around insert 10 is to make the interface mechanically sound. However, stiff collar 30 makes it difficult to manufacture and assemble cooling insert 10 into the nozzle cavity. Also the necessary machining of rib 31 is difficult due to the casting tolerances of internal rib 31. Accordingly, there is a need for a better interface to the internal ribs.

In addition, cooling inserts that are mounted on internal airfoil cavities to "flashribs" also have stiff collars on the cooling inserts and the nozzle interface must be machined on both sides of the internal ribs. This makes for a complex assembly as close tolerance fits are required to braze or Laser or Electron Beam weld the inserts to the nozzle. Much scrap and rework often must be produced due to the complex interface. In addition, the part life is reduced due to leakage across the joint and weak joints that create cooling loss and cracking.

SUMMARY OF THE INVENTION

It is an object of the present invention to overcome the above described problems and limitations of conventional cooling insert and nozzle assemblies.

An exemplary embodiment of the invention involves the use of cast-in "T" or "L" sections at the end of specific nozzle internal ribs. The first rib at opposite ends of the nozzle is cast-in with "L" sections while the interior ribs are cast-in with "T" sections.

Another objective of the present invention is to improve the assembly interface between the cooling insert and the nozzle internal ribs which makes manufacturing of the insert much improved. The present invention provides significant improvements in the machining manufacturability of the nozzle thereby reducing the amount of scrap or rework that is needed in machining the nozzle ribs.

DETAILED DESCRIPTION OF THE INVENTION

Figure 1:
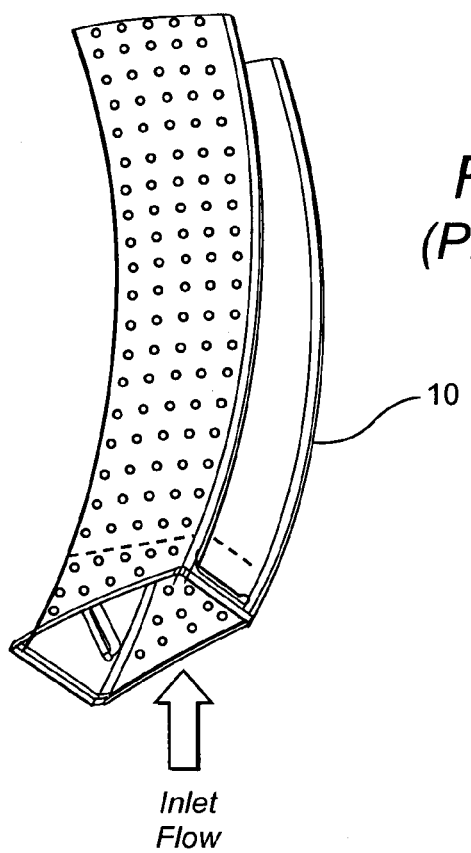
FIG. 1 shows an insert used in nozzles for cooling generators.
Figure 2:
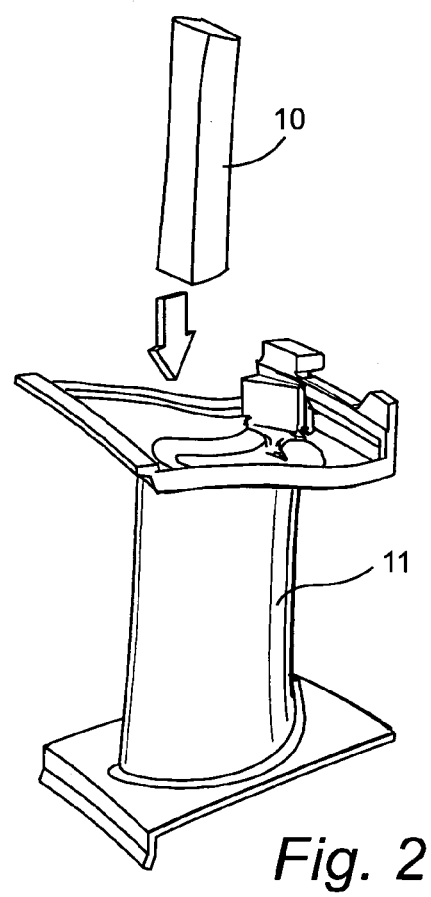
FIG. 2 shows the insert of FIG. 1 being assembled to a nozzle.
Figure 3:
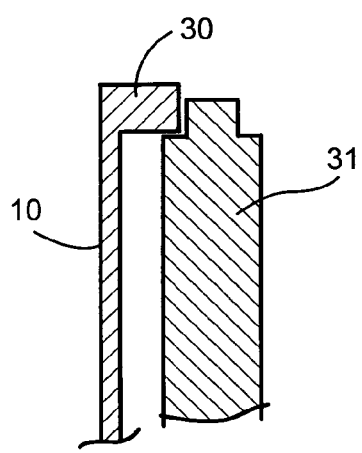
FIG. 3 is a two dimensional schematic of a conventional insert and nozzle rib assembly.
Figure 4:
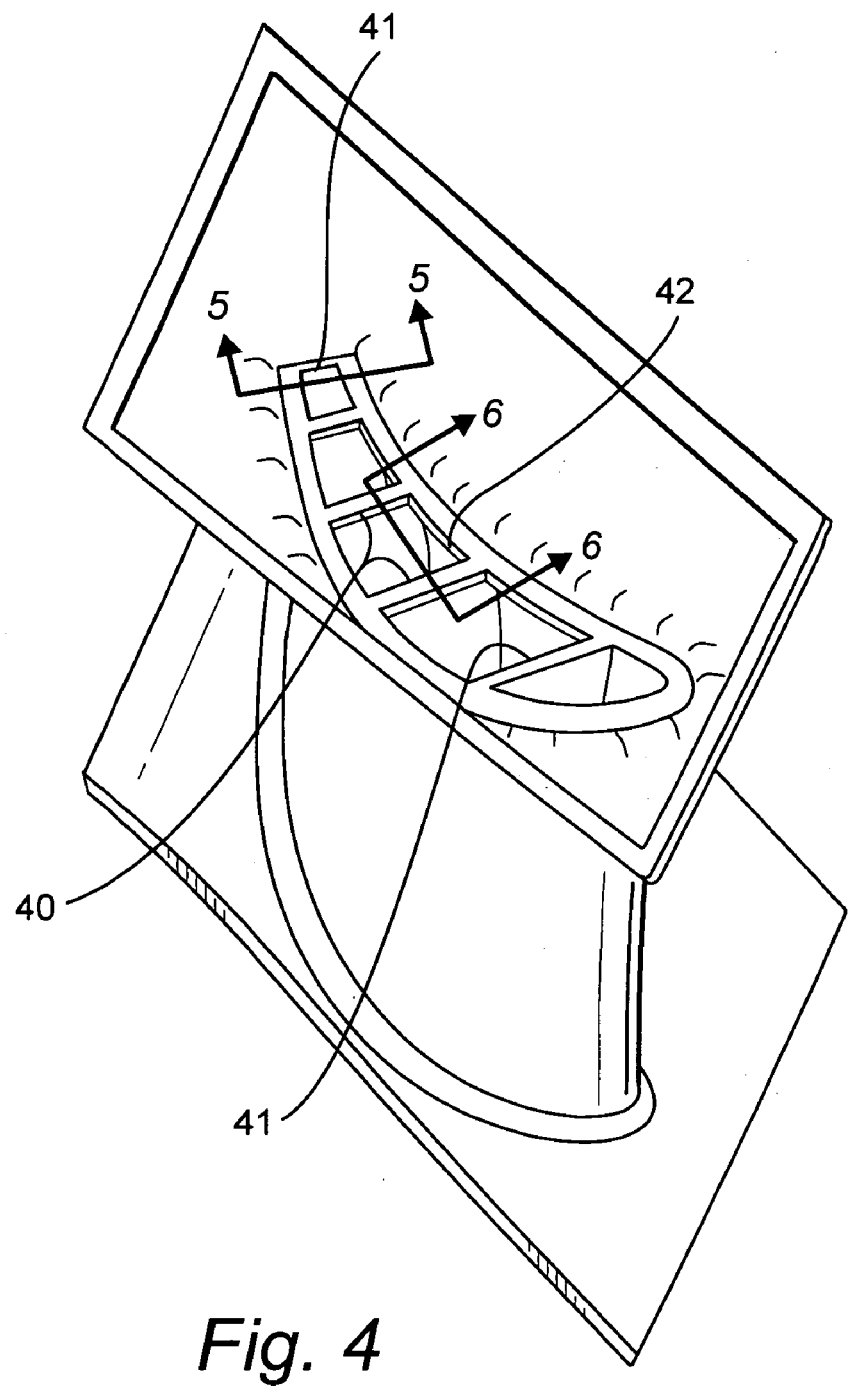
FIG. 4 is an isometric view of the nozzle showing the location of cast-in "T" and "L" sections at the ends of ribs.

FIG. 4 shows an exemplary embodiment of the invention depicting the locations of cast-in "T" sections 40 on the bottom of specific internal airfoil ribs and cast-in "L" sections 41 on the bottom of other specific internal airfoil ribs. The "T" and "L" sections locations, as shown in FIG. 4, are at the end that the insert cooling flow enters the specific cavity. Flash ribs 42 are also located around the perimeters of the cavities.

Prior to assembly of the insert and nozzle, the inside shape of the flash ribs, "T" sections and "L" sections are machined along their inside surface. This is performed by a simple plunge operation with an EDM machine or a small mill end. Depending upon the casting tolerance capability, this area may not require machining prior to the assembly of the insert.

Figure 5:
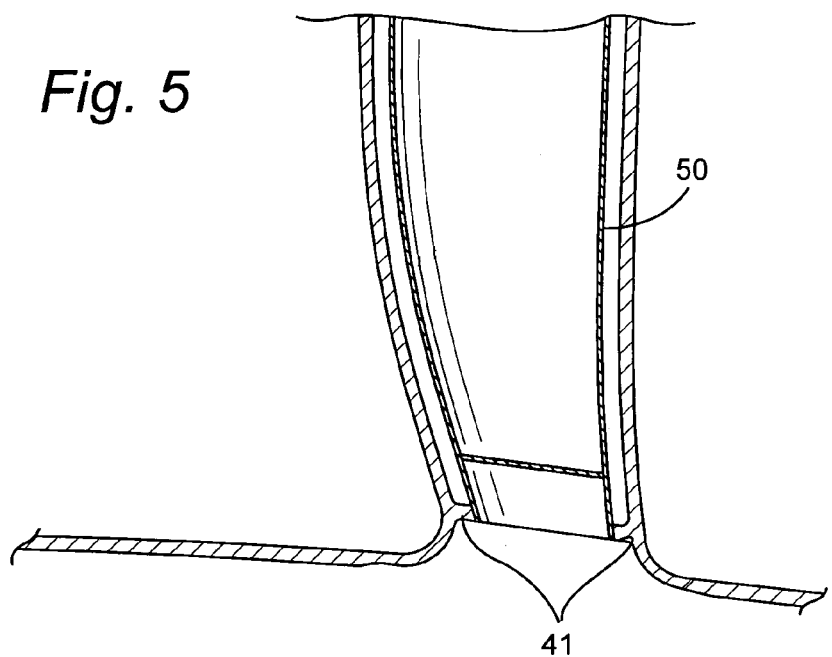
FIG. 5 is a two dimensional drawing of an exemplary embodiment of the invention involving cast-in "L" sections at the ends of ribs along cross-section lines 5—5 in FIG. 4.
Figure 6:
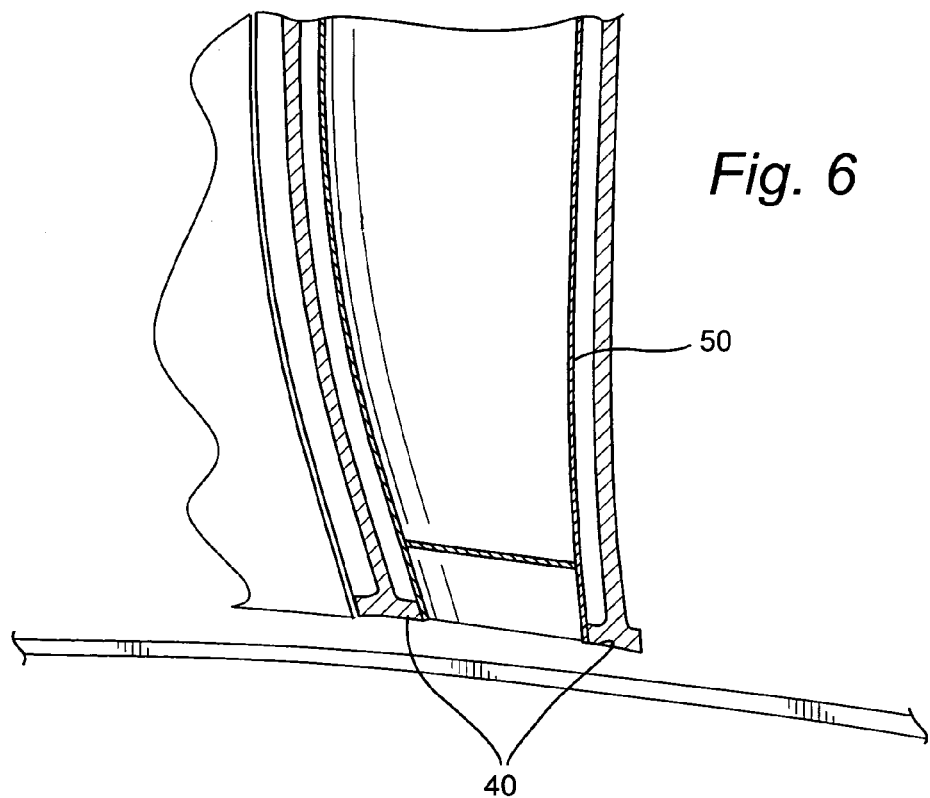
FIG. 6 is a two dimensional drawing of an exemplary embodiment of the invention involving cast-in "T" sections at ends of ribs along cross-section lines 6—6 in FIG. 4.

The cooling insert 50, depicted in FIGS. 5 and 6, is flexible at one end so as to form itself between the "T" or "L" sections of the ribs. Thus, as shown in FIG. 5, cooling insert 50 flexibly forms itself between "L" sections 41. Similarly, as shown in FIG. 6, cooling insert 50 flexibly forms itself between "T" sections 40. As will be recognized by those skilled in the art the flexible end of cooling insert can flexibly form itself between adjacent ribs having a "T" and an "L" section, respectively (not shown). This arrangement of the insert and nozzle ribs sets the impingement gap between the insert and the nozzle at these locations. As a result, the nozzle machining is simplified and there is no longer the worry of not having enough rib material to make a step on each side.

The position of the insert between the nozzle ribs is fixed by welding or brazing the flexible end of the insert to the "T" and/or "L" sections of the nozzle ribs.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A cooling insert/nozzle assembly for use in gas turbines comprising:
   a nozzle with ribs at exterior and interior locations, wherein the ribs at the interior locations of said nozzle have cast-in "T" sections at one end; and
   a cooling insert having a flexible end that facilitates insertion of said cooling insert into said nozzle with the flexible end of said cooling insert being inserted between adjacent ribs having said cast-in "T" sections at one end.

2. An assembly as recited in claim 1, wherein the ribs at the exterior locations of said nozzle have cast-in "L" sections at one end, and wherein said cooling insert having a flexible end is inserted between adjacent ribs having said cast-in "L" sections at one end.

3. An assembly as recited in claim 2, wherein said cooling insert is fixed to said adjacent ribs by welding.

4. An assembly as recited in claim 2, wherein said cooling insert is fixed to said adjacent ribs by brazing.

5. An assembly as recited in claim 2, wherein a second cooling insert having a flexible end is inserted between adjacent ribs having said cast-in "T" section and "L" section, respectively.

6. An assembly as recited in claim 5, wherein said cooling insert and said second cooling insert are fixed to said adjacent ribs by any one of welding and brazing.

* * * * *